(12) United States Patent
Mase et al.

(10) Patent No.: US 9,312,569 B2
(45) Date of Patent: Apr. 12, 2016

(54) ADDITIVE FOR LEAD-ACID BATTERY AND LEAD-ACID BATTERY

(75) Inventors: Shunzo Mase, Aichi (JP); Akiya Kozawa, Nagoya (JP)

(73) Assignees: Shunzo Mase, Aichi (JP); Akiya Kozawa, Aichi (JP); Takeshi Kawabe, Kanagawa (JP)

( * ) Notice: Subject to any disclaimer, the term of this patent is extended or adjusted under 35 U.S.C. 154(b) by 184 days.

(21) Appl. No.: 14/240,249

(22) PCT Filed: Aug. 14, 2012

(86) PCT No.: PCT/JP2012/070948
§ 371 (c)(1),
(2), (4) Date: Feb. 21, 2014

(87) PCT Pub. No.: WO2013/031557
PCT Pub. Date: Mar. 7, 2013

(65) Prior Publication Data
US 2014/0170477 A1    Jun. 19, 2014

(30) Foreign Application Priority Data
Aug. 29, 2011   (JP) ................. 2011-201137

(51) Int. Cl.
C08F 12/30    (2006.01)
C08F 20/06    (2006.01)
C08F 118/02   (2006.01)
H01M 10/08    (2006.01)

(52) U.S. Cl.
CPC .............. *H01M 10/08* (2013.01); *Y02E 60/126* (2013.01)

(58) Field of Classification Search
CPC ............................ H01M 10/08; Y02E 60/126
USPC ...................... 526/287, 317.1, 319
See application file for complete search history.

(56) References Cited

U.S. PATENT DOCUMENTS

| | | | | |
|---|---|---|---|---|
| 3,200,100 A | * | 8/1965 | Dennstedt | C08F 20/44 526/201 |
| 5,518,630 A | * | 5/1996 | Freese | C02F 5/10 210/698 |
| 2010/0187982 A1 | * | 7/2010 | Hsu | H01L 51/5088 313/504 |

FOREIGN PATENT DOCUMENTS

| | | |
|---|---|---|
| JP | 2001-313064 | 11/2001 |
| JP | 2004-292648 | 10/2004 |
| JP | 2004-292649 | 10/2004 |

* cited by examiner

*Primary Examiner* — William Cheung
(74) *Attorney, Agent, or Firm* — DeLio, Peterson & Curcio, LLC; Peter W. Peterson

(57) ABSTRACT

An additive for lead-acid battery including sulfonated polyacrylic acid aimed at extending the battery life by preventing the sulfation of the negative electrode, and a lead-acid battery using the additive.

34 Claims, 1 Drawing Sheet

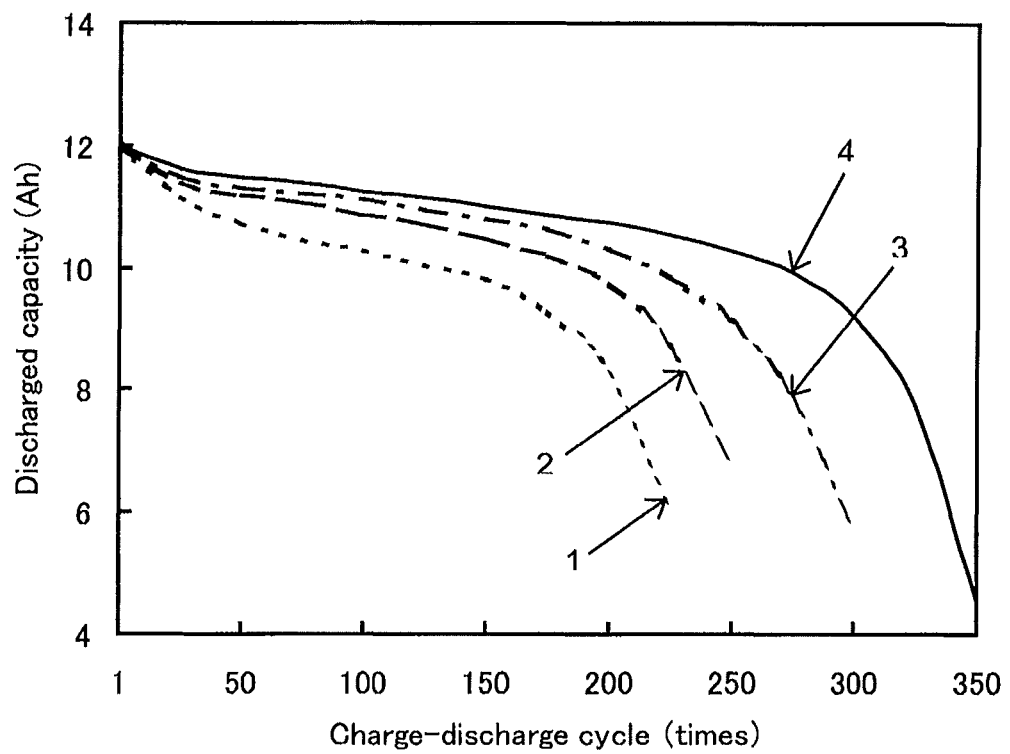

ADDITIVE FOR LEAD-ACID BATTERY AND LEAD-ACID BATTERY

This application is a U.S. National stage application of International Application No. PCT/JP2012/070948, filed Aug. 14, 2012, which claims priority to Japanese Patent Application No. 2011-201137 filed on Aug. 29, 2011, the contents of each of which are hereby incorporated herein by reference.

BACKGROUND OF THE INVENTION

1. Field of the Invention

This invention relates to a long-lived activator additive for the life extension of the lead-acid batteries and a battery using the additive.

2. Description of Related Art

Conventionally, the inventors and others discovered that polyvinyl alcohol and polyacrylic acid had an effect to increase the hydrogen overvoltage of the electrode in diluted sulfuric acid and were effective in eliminating the sulfation of deteriorated battery and in making a new battery long-lived, and applied for patents (For instance, see patent document 1, patent document 2, and patent document 3).

However, polyvinyl alcohol, added to the acid electrolyte, has a considerable foam formation (hydrogen gas production at the negative electrode) when the charge current is large, the sulfuric acid is carried out from the upper hole of the battery. This over flow of the acid sometimes corrodes the battery terminal metals and the battery container case. Another problem of the polyvinyl alcohol is the short effective life period: the polymer is oxidized at the positive electrode slowly and the molecule is decomposed and the concentration is reduced. Therefore for the good effect, the polymer must be added once a year or every other year.

The polyacrylic acid or its alkali metal salt is very effective, but the viscosity of the solution is very high, a good solution was difficult to produce. Also the powder is difficult to dissolve to the battery acid electrolyte. For the dissolution of the polyacrylic acid, agitation for long time is required.

PRIOR ART DOCUMENTS

Patent Documents

Patent document 1: Japanese patent gazette 3431438
Patent document 2: Unexamined Japanese patent publication bulletin 2000-149981
Patent document 3: Unexamined Japanese patent publication bulletin 2001-313064

SUMMARY OF THE INVENTION

Objective of the Invention

This invention provide a new polymer activator additive that has a longer effective time and produce less foam formation when added to the acid electrolyte of the lead-acid batteries. Also the addition of the new polymer is easy, thus provide long life lead-acid battery easily.

Technology to Dissolve the Proposed Technical Points

The present additive invention is a polymer or copolymer containing one or more structures from the following chemical formula 1 to the chemical formula 6. The said additive polymer or copolymer contains the —COOH (carboxyl base) and —SO$_3$H (sulfo group) based on the chemical formula 1 through the chemical formula 6 in the original material. The preferred materials is 1:9 to 8:2 for the molar ratio of carboxyl base:sulfo base, the more preferred molar ratio is in the range of from 2:8 to 6:4, and the preferred structure of the polymer or copolymer has the molecular weight of 1,000,000 to 10,000,000, more preferred molecular weight from 3,000,000 to 7,000,000. In the chemical equation, M and M* can be the same kind atom or different kind atom.

Chemical formula 1

(In the formula, M indicates hydrogen atom, alkali metal atom or ammonium group.)

Chemical formula 2

(In the formula, M indicates hydrogen atom, alkali metal atom or ammonium group.)

Chemical formula 3

(In the formula, M and M* indicates hydrogen atom, alkali metal atom or ammonium group.)

Chemical formula 4

(In the formula, M and M* indicates hydrogen atom, alkali metal atom or ammonium group.)

Chemical formula 5

(In the formula, M and M* indicates hydrogen atom, alkali metal atom or ammonium group.)

Chemical formula 6

(In the formula, M and M* indicates hydrogen atom, alkali metal atom or ammonium group.)

Moreover, this invention is an additive for lead-acid battery containing sulfonated polyacrylic acid (polymer containing either of chemical formula 1 through 3 as a structural unit), and the molar ratio of the carboxyl group to the sulfo group in the said polymer is preferably in the range of 1:9 to 8:2, more preferably 2:8 to 6:4, and the average molecular weight of the said polymer is preferably 1,000,000 to 10,000,000, more preferably 3,000,000 to 7,000,000.

Moreover, this invention is a lead-acid battery comprising a positive electrode of lead peroxide, a negative electrode of metal lead and an electrolyte of diluted sulfuric acid wherein a polymer or copolymer additive including at least one kind of the structural unit expressed by the said chemical formula 1 through 6, and a carboxyl group and sulfo group originated in the said chemical formula 1 through 6 are included in the said electrolyte, and the molar ratio of the said carboxyl group to the said sulfo group in the said polymer or copolymer is preferably in the range of 1:9 through 8:2, more preferably 2:8 through 6:4, and the average molecular weight of the said polymer or copolymer is preferably from 1,000,000 to 10,000,000, more preferably 3,000,000 to 7,000,000, and the concentration of the said polymer or copolymer in the said electrolyte is preferably from 0.02 to 1 percent by weight, more preferably from 0.1 to 0.5 percent by weight.

Furthermore, this invention is a lead-acid battery comprising a positive electrode of lead peroxide, a negative electrode of metal lead, and an electrolyte of diluted sulfuric acid, wherein a sulfonated polyacrylic acid (polymer which contains either of the said chemical formulas 1 through 3 as a structural unit) is contained in the said electrolyte, and the molar ratio of the carboxyl group to the sulfo group in the said sulfonated polyacrylic acid is preferably in the range of 1:9 through 8:2, more preferably 2:8 through 6:4, and the average molecular weight of the said sulfonated polyacrylic acid is preferably 1,000,000 to 10,000,000, more preferably 3,000,000 to 7,000,000, and the concentration of the said sulfonated polyacrylic acid in the said electrolyte is preferably 0.02 to 1 percent by weight, more preferably 0.1 to 0.5 percent by weight.

The effect of the additive of the invention is as follows: The carboxyl group of the acrylic acid, fumaric acid and maleic acid, which are the structural units of the polymer or copolymer of this invention, is able to prevent and restore the sulfation, which is the biggest factor of the deterioration of lead-acid batteries, by the action on the surface of negative electrode of lead-acid batteries, increasing the hydrogen overvoltage on the negative electrode and promoting the electrolytic reduction of lead sulfate. In that case, though these polymers or copolymers with larger molecular weight were not easily oxidized at the positive electrode and were long-lived, the rate of dissolution was smaller and the viscosity was larger for the one with larger molecular weight, and it inhibited their practical uses. The sulfo group, which is newly introduced in this invention, has an effect to make the battery long-lived due to the less decomposition during the charge/discharge cycle of the battery, and also has features to extremely facilitate the dissolution of additives in the electrolyte and to decrease the viscosity of the electrolyte. In this invention, the dissolution rate of the additive to the electrolyte is greatly improved, the viscosity of the solution is decreased, and the durability is also greatly improved by the introduction of the sulfo group without losing the excellent oxidation resistivity and low bubbling property of the acrylic-type polymer.

As for the additive of this invention, though the amount of the carboxyl group and sulfo group can be arbitrarily selected comparing the effect to increase the hydrogen overvoltage of the negative electrode with the effect to improve the dissolubility of the additive, the molar ratio of the carboxyl group and sulfo group is preferably in the range of 1:9 through 8:2, more preferably 2:8 through 6:4. When the ratio of the carboxyl group is smaller than the above value, the effect to increase the hydrogen overvoltage becomes insufficient, and when the ratio of the sulfo group is smaller than above value, the improvement in solubility becomes insufficient. Moreover, the average molecular weight is preferably from 1,000,000 to 10,000,000, more preferably 3,000,000 to 7,000,000. When the molecular weight is smaller than the above-cited value, the additive is susceptible to oxidation at the positive electrode, and the effect disappears in a short time. When the molecular weight is larger than the above-cited value, the viscosity increases, and the work of addition becomes difficult. In addition, sulfonated polyacrylic acid is suitably used as the polymer because its manufacturing method is established and the quality is stable.

As for the battery of this invention, the additive of this invention is used by adding preferably from 0.02 to 1 percent by weight, more preferably from 0.1 to 0.5 percent by weight to the electrolyte. When the amount of the additive is less than the above-cited value, the effect of the additive disappears in a short time because the additive is entirely decomposed by the oxidation at the positive electrode in a short time. As for the battery lifetime, when the amount of the additive is more than the above-cited value, it tends to be saturated though an adverse effect is not recognized.

In addition, it is also possible to use the additive of this invention as a mixture with conventionally used polyvinyl alcohol or polyacrylic acid. For instance, it is useful to apply the following process: a deteriorated electrode due to the sulfation is quickly recovered by electrolysis in the electrolyte in which polyvinyl alcohol or polyacrylic acid is added, and then the sulfonated polyacrylic acid of this invention is added to the electrolyte in order to obtain a long-term lifetime for the recovered battery.

Advantageous Effect of the Invention

As mentioned above, the additive of this invention is effective in suppressing bubbling during charging, dissolving to electrolyte and water easily, and keeping the battery capacity after the charge/discharge cycle of many times. The lead-acid battery, which contains this additive in the electrolyte, can have about twice the lifetime compared with a conventional lead-acid battery.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a graph where the effect of additive of this invention was compared with conventional product.

DESCRIPTION OF THE PREFERRED EMBODIMENT(S)

Example 1

Lead-acid batteries of 12V of nominal voltage and 12 Ah of capacity were used. As the samples of conventional art, three kinds of dilute sulfuric acid electrolytes with: (1) additive-free; (2) 1 g/liter of polyvinyl alcohol; (3) 1 g/liter of polyacrylic acid, were used. As the sample of this invention, a dilute sulfuric acid electrolyte with: (4) 1 g/liter of sulfonated polyacrylic acid, was used. Charge/discharge cycle tests were carried out under the condition of 5 A of discharge current and 9V of discharge cutoff voltage, and the changes in their discharge capacity were measured.

As a result, the discharged capacity of the battery without additive greatly decreased at about 200 cycles as indicated by the curve 1 in FIG. 1. When polyvinyl alcohol was added, the lifetime increased by about 30 cycles as indicated by the curve 2. When polyacrylic acid was added, an effect to increase the lifetime by about 70 cycles was observed as indicated by the curve 3.

As for the sulfonated polyacrylic acid, which was the additive of this invention, a life-extension effect of about 120 cycles was observed as indicated by the curve 4. When the sulfonated polyacrylic acid was added once again after 200 cycles of charge/discharge, the life was extended further, and the total lifetime of about 400 cycles was observed.

In addition, the molecular weight of the additives used in this example were as follows: the molecular weight of polyvinyl alcohol was 120,000; the molecular weight of the polyacrylic acid was 5,000,000; the molecular weight of the sulfonated polyacrylic acid was 5,000,000. The sulfonated polyacrylic acid used in this example was a polymer consisted of structural units of the chemical formula 1 and the chemical formula 2, and the molar ratio of the carboxyl group to the sulfo group was 3:7.

Example 2

The additives, which consisted of the polymer or copolymer of the chemical formulas 1 through 6, were added to the battery electrolytes in lead-acid batteries having the same specification with the lead-acid batteries used in example 1, and the charge/discharge cycle tests were carried out under the same condition with example 1, and the cycle number when the amount of the electrical discharge decreased to 8 Ah was measured.

The result is shown in Table 1.

TABLE 1

| No. | Composition | Ratio of carboxyl group to sulfo group | Molecular weight | Concentration in electrolyte (%) | Charge/Discharge cycle (times) |
|---|---|---|---|---|---|
| 1 | Chemical formula 1 + Chemical formula 3 | 60:40 | 4,000,000 | 0.05 | 320 |
| 2 | Chemical formula 1 + Chemical formula 3 | 60:40 | 6,000,000 | 0.2 | 355 |
| 3 | Chemical formula 3 + Chemical formula 4 | 55:45 | 3,000,000 | 0.1 | 315 |
| 4 | Chemical formula 4 + Chemical formula 5 | 60:40 | 2,000,000 | 0.1 | 300 |
| 5 | Chemical formula 5 + Chemical formula 6 | 25:75 | 2,000,000 | 0.1 | 280 |

Description of codes
1: Changes in the amount of electrical discharge according to the charge/discharge cycles without additive
2: Changes in the amount of electrical discharge according to the charge/discharge cycles with the addition of polyvinyl alcohol
3: Changes in the amount of electrical discharge according to the charge/discharge cycles with the addition of polyacrylic acid
4: Changes in the amount of electrical discharge according to the charge/discharge cycles with the addition of sulfonated polyacrylic acid While the present invention has been particularly described, in conjunction with a specific preferred embodiment, it is evident that many alternatives, modifications and variations will be apparent to those skilled in the art in light of the foregoing description.

It is therefore contemplated that the appended claims will embrace any such alternatives, modifications and variations as falling within the true scope and spirit of the present invention.

Thus, having described the invention, what is claimed is:

1. An additive to be added to the electrolyte of lead-acid batteries comprising a positive electrode of lead peroxide, a negative electrode of metal lead and an electrolyte of diluted sulfuric acid, wherein the said additive is a polymer or copolymer including at least one kind of structural unit expressed by the following chemical formulas 1 through 6, the said polymer or copolymer including a carboxyl group and sulfo group

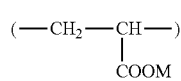

Chemical formula 1

(In the formula, M indicates hydrogen atom, alkali metal atom or ammonium group)

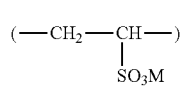

Chemical formula 2

(In the formula, M indicates hydrogen atom, alkali metal atom or ammonium group)

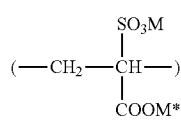

Chemical formula 3

(In the formula, M and M* indicates hydrogen atom, alkali metal atom or ammonium group)

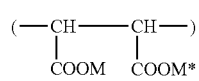

Chemical formula 4

(In the formula, M and M* indicates hydrogen atom, alkali metal atom or ammonium group)

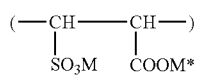
Chemical formula 5

(In the formula, M and M* indicates hydrogen atom, alkali metal atom or ammonium group)

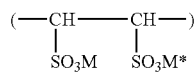
Chemical formula 6

(In the formula, M and M* indicates hydrogen atom, alkali metal atom or ammonium group).

2. The additive of claim 1 wherein the molar ratio of the said carboxyl group to the said sulfo group in the said polymer or copolymer is in the range of 1:9 through 8:2.

3. The additive of claim 1 wherein the average molecular weight of the said polymer or copolymer is from 1,000,000 to 10,000,000.

4. The additive of claim 1 wherein the molar ratio of the said carboxyl group to the said sulfo group in the said polymer or copolymer is in the range of 1:9 through 8:2, preferably 2:8 through 6:4, and the average molecular weight of the said polymer or copolymer is from 1,000,000 to 10,000,000.

5. An additive to be added to the electrolyte of lead-acid batteries comprising a positive electrode of lead dioxide, a negative electrode of metallic lead and an electrolyte of dilute sulfuric acid, wherein the said additive is characterized by containing sulfonated polyacrylic acid having a carboxyl group and a sulfo group.

6. The additive of claim 5 wherein the molar ratio of the said carboxyl group to the said sulfo group is in the range of 1:9 through 8:2.

7. The additive of claim 5 wherein the average molecular weight of the said additive is from 1,000,000 to 10,000,000.

8. The additive of claim 5 wherein the molar ratio of the said carboxyl group to the said sulfo group is in the range of 1:9 through 8:2, preferably 2:8 through 6:4, and the average molecular weight of the said additive is from 1,000,000 to 10,000,000.

9. A lead-acid battery comprising a positive electrode of lead peroxide, a negative electrode of metal lead, an electrolyte of diluted sulfuric acid and a polymer or copolymer additive in the electrolyte including at least one kind of structural unit expressed by the following chemical formulas 1 through 6, the said polymer or copolymer additive including a carboxyl group and sulfo group

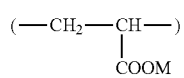
Chemical formula 1

(In the formula, M indicates hydrogen atom, alkali metal atom or ammonium group)

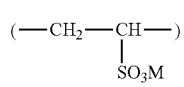
Chemical formula 2

(In the formula, M indicates hydrogen atom, alkali metal atom or ammonium group)

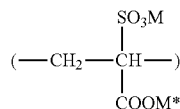
Chemical formula 3

(In the formula, M and M* indicates hydrogen atom, alkali metal atom or ammonium group)

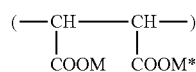
Chemical formula 4

(In the formula, M and M* indicates hydrogen atom, alkali metal atom or ammonium group)

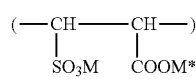
Chemical formula 5

(In the formula, M and M* indicates hydrogen atom, alkali metal atom or ammonium group)

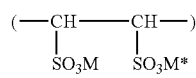
Chemical formula 6

(In the formula, M and M* indicates hydrogen atom, alkali metal atom or ammonium group)

and wherein the concentration of the said polymer or copolymer additive in the said electrolyte is from 0.02 to 1 percent by weight.

10. The lead-acid battery of claim 9 wherein the molar ratio of the said carboxyl group to the said sulfo group in the said polymer or copolymer additive is in the range of 1:9 through 8:2.

11. The lead-acid battery of claim 9 wherein the average molecular weight of the said polymer or copolymer additive is from 1,000,000 to 10,000,000.

12. A lead-acid battery comprising a positive electrode of lead peroxide, a negative electrode of metal lead, an electrolyte of diluted sulfuric acid, and a polymer or copolymer additive in the electrolyte including at least one kind of structural unit expressed by the following chemical formulas 1 through 6, the said polymer or copolymer additive including a carboxyl group and sulfo group

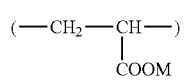
Chemical formula 1

(In the formula, M indicates hydrogen atom, alkali metal atom or ammonium group)

$$(-CH_2-CH-)\atop |\atop SO_3M$$ Chemical formula 2

(In the formula, M indicates hydrogen atom, alkali metal atom or ammonium group)

$$\begin{matrix}&SO_3M\\&|\\(-CH_2-&CH-)\\&|\\&COOM^*\end{matrix}$$ Chemical formula 3

(In the formula, M and M* indicates hydrogen atom, alkali metal atom or ammonium group)

$$(-CH-CH-)\atop |\quad\ |\atop COOM\ COOM^*$$ Chemical formula 4

(In the formula, M and M* indicates hydrogen atom, alkali metal atom or ammonium group)

$$(-CH-CH-)\atop |\quad\ |\atop SO_3M\ COOM^*$$ Chemical formula 5

(In the formula, M and M* indicates hydrogen atom, alkali metal atom or ammonium group)

$$(-CH-CH-)\atop |\quad\ |\atop SO_3M\ SO_3M^*$$ Chemical formula 6

(In the formula, M and M* indicates hydrogen atom, alkali metal atom or ammonium group)
and wherein the molar ratio of the said carboxyl group to the said sulfo group in the said polymer or copolymer additive is in the range of 1:9 through 8:2, and the concentration of the said polymer or copolymer additive in the said electrolyte is from 0.02 to 1 percent by weight.

13. A lead-acid battery comprising a positive electrode of lead peroxide, a negative electrode of metal lead, an electrolyte of diluted sulfuric acid, and a polymer or copolymer additive in the electrolyte including at least one kind of structural unit expressed by the following chemical formulas 1 through 6, the said polymer or copolymer additive including a carboxyl group and sulfo group $$(-CH_2-CH-)\atop |\atop COOM$$ Chemical formula 1

(In the formula, M indicates hydrogen atom, alkali metal atom or ammonium group)

$$(-CH_2-CH-)\atop |\atop SO_3M$$ Chemical formula 2

(In the formula, M indicates hydrogen atom, alkali metal atom or ammonium group)

$$\begin{matrix}&SO_3M\\&|\\(-CH_2-&CH-)\\&|\\&COOM^*\end{matrix}$$ Chemical formula 3

(In the formula, M and M* indicates hydrogen atom, alkali metal atom or ammonium group)

$$(-CH-CH-)\atop |\quad\ |\atop COOM\ COOM^*$$ Chemical formula 4

(In the formula, M and M* indicates hydrogen atom, alkali metal atom or ammonium group)

$$(-CH-CH-)\atop |\quad\ |\atop SO_3M\ COOM^*$$ Chemical formula 5

(In the formula, M and M* indicates hydrogen atom, alkali metal atom or ammonium group)

$$(-CH-CH-)\atop |\quad\ |\atop SO_3M\ SO_3M^*$$ Chemical formula 6

(In the formula, M and M* indicates hydrogen atom, alkali metal atom or ammonium group)
and wherein the molar ratio of the said carboxyl group to the said sulfo group in the said polymer or copolymer is in the range of 1:9 through 8:2, and the average molecular weight of the said polymer or copolymer is from 1,000,000 to 10,000,000, and the concentration of the said polymer or copolymer in the said electrolyte is from 0.02 to 1 percent by weight.

14. A lead-acid battery comprising a positive electrode of lead peroxide, a negative electrode of metal lead and an electrolyte of diluted sulfuric acid wherein an additive of sulfonated polyacrylic acid is included in the said electrolyte, and wherein the concentration of the said additive in the said electrolyte is from 0.02 to 1 percent by weight.

15. The lead-acid battery of claim 14 wherein the molar ratio of the said carboxyl group to the said sulfo group in the said additive is in the range of 1:9 through 8:2.

16. The lead-acid battery of claim 14 wherein the average molecular weight of the said additive is from 1,000,000 to 10,000,000.

17. A lead-acid battery comprising a positive electrode of lead peroxide, a negative electrode of metal lead and an electrolyte of diluted sulfuric acid wherein an additive of sulfonated polyacrylic acid is included in the said electrolyte, and wherein the molar ratio of the said carboxyl group to the said sulfo group in the said additive is in the range of 1:9 through 8:2, and the concentration of the said additive in the said electrolyte is from 0.02 to 1 percent by weight.

18. A lead-acid battery comprising a positive electrode of lead peroxide, a negative electrode of metal lead and an electrolyte of diluted sulfuric acid wherein an additive of sulfonated polyacrylic acid is included in the said electrolyte, and wherein the molar ratio of the said carboxyl group to the said sulfo group in the said additive is in the range of 1:9 through 8:2, and the average molecular weight of the said additive is from 1,000,000 to 10,000,000, and the concentration of the said additive in the said electrolyte is from 0.02 to 1 percent by weight.

19. The additive of claim 2 wherein the molar ratio of the said carboxyl group to the said sulfo group is in the range of 2:8 through 6:4.

20. The additive of claim 3 wherein the average molecular weight is from 3,000,000 to 7,000,000.

21. The additive of claim 4 wherein the molar ratio of the said carboxyl group to the said sulfo group is in the range of 2:8 through 6:4, and the average molecular weight is from 3,000,000 to 7,000,000.

22. The additive of claim 6 wherein the molar ratio of the said carboxyl group to the said sulfo group is in the range of 2:8 through 6:4.

23. The additive of claim 7 wherein the average molecular weight is from 3,000,000 to 7,000,000.

24. The additive of claim 8 wherein the molar ratio of the said carboxyl group to the said sulfo group is in the range of 2:8 through 6:4, and the average molecular weight is from 3,000,000 to 7,000,000.

25. The lead-acid battery of claim 10 wherein the molar ratio of the said carboxyl group to the said sulfo group is in the range of 2:8 through 6:4.

26. The lead-acid battery of claim 11 wherein the average molecular weight is from 3,000,000 to 7,000,000.

27. The lead-acid battery of claim 9 wherein the concentration of the said additive in the said electrolyte is from 0.1 to 0.5 percent by weight.

28. The lead-acid battery of claim 12 wherein the molar ratio of the said carboxyl group to the said sulfo group is in the range of 2:8 through 6:4, and the concentration of the said additive in the said electrolyte is from 0.1 to 0.5 percent by weight.

29. The lead-acid battery of claim 13 wherein the molar ratio of the said carboxyl group to the said sulfo group is in the range of 2:8 through 6:4, and the average molecular weight is from 3,000,000 to 7,000,000, and the concentration of the said additive in the said electrolyte is from 0.1 to 0.5 percent by weight.

30. The lead-acid battery of claim 15 wherein the molar ratio of the said carboxyl group to the said sulfo group is in the range of 2:8 through 6:4.

31. The lead-acid battery of claim 16 wherein the average molecular weight is from 3,000,000 to 7,000,000.

32. The lead-acid battery of claim 14 wherein the concentration of the said additive in the said electrolyte is from 0.1 to 0.5 percent by weight.

33. The lead-acid battery of claim 17 wherein the molar ratio of the said carboxyl group to the said sulfo group is in the range of 2:8 through 6:4, and the concentration of the said additive in the said electrolyte is from 0.1 to 0.5 percent by weight.

34. The lead-acid battery of claim 18 wherein the molar ratio of the said carboxyl group to the said sulfo group is in the range of 2:8 through 6:4, and the average molecular weight is from 3,000,000 to 7,000,000, and the concentration of the said additive in the said electrolyte is from 0.1 to 0.5 percent by weight.

\* \* \* \* \*